(12) United States Patent
Wiggs

(10) Patent No.: US 7,401,641 B1
(45) Date of Patent: Jul. 22, 2008

(54) VERTICALLY ORIENTED DIRECT EXCHANGE/GEOTHERMAL HEATING/COOLING SYSTEM SUB-SURFACE TUBING INSTALLATION MEANS

(75) Inventor: B. Ryland Wiggs, Franklin, TN (US)

(73) Assignee: Earth to Air Systems, LLC, Franklin, TN (US)

( * ) Notice: Subject to any disclaimer, the term of this patent is extended or adjusted under 35 U.S.C. 154(b) by 450 days.

(21) Appl. No.: 10/852,341

(22) Filed: May 24, 2004

(51) Int. Cl.
*F28F 7/00* (2006.01)
*F24J 3/08* (2006.01)

(52) U.S. Cl. .......................... 165/11.1; 165/45; 165/76; 166/77.1; 166/355

(58) Field of Classification Search .......... 165/45, 165/46, 76, 11.1; 73/152.01, 152.13; 166/57, 166/77.1, 77.2, 206, 208, 244.2, 355
See application file for complete search history.

(56) References Cited

U.S. PATENT DOCUMENTS

| | | | |
|---|---|---|---|
| 4,224,805 A | 9/1980 | Rothwell | 62/260 |
| 4,257,239 A | 3/1981 | Partin et al. | 62/238.7 |
| 4,378,787 A | 4/1983 | Fleischmann | 126/430 |
| 4,459,752 A * | 7/1984 | Babcock | 73/152.01 |
| 4,544,021 A | 10/1985 | Barrett | 165/45 |
| 4,741,388 A | 5/1988 | Kuroiwa | 165/45 |
| 4,858,679 A * | 8/1989 | Sakaya et al. | 165/46 |
| 4,858,694 A * | 8/1989 | Johnson et al. | 166/355 |
| 5,025,634 A | 6/1991 | Dressler | 62/79 |
| 5,029,633 A * | 7/1991 | Mann | 165/45 |
| 5,038,580 A | 8/1991 | Hart | 62/324.6 |
| 5,054,297 A * | 10/1991 | Furuhama | 165/45 |
| 5,313,804 A | 5/1994 | Kaye | 62/160 |
| 5,461,876 A | 10/1995 | Dressler | 62/160 |
| 5,477,703 A * | 12/1995 | Hanchar et al. | 165/45 |
| 5,477,914 A | 12/1995 | Rawlings | 165/45 |
| 5,533,355 A | 7/1996 | Rawlings | 62/260 |
| 5,560,220 A | 10/1996 | Cochran | 62/260 |
| 5,561,985 A | 10/1996 | Cochran | 62/260 |
| 5,564,282 A | 10/1996 | Kaye | 62/160 |
| 5,623,986 A | 4/1997 | Wiggs | 165/45 |
| 5,671,608 A | 9/1997 | Wiggs et al. | 62/260 |
| 5,706,888 A | 1/1998 | Ambs et al. | 165/155 |
| 5,738,164 A | 4/1998 | Hildebrand | 165/45 |
| 5,758,514 A | 6/1998 | Genung | 62/471 |
| 5,771,700 A | 6/1998 | Cochran | 62/117 |
| 5,816,314 A | 10/1998 | Wiggs et al. | 165/45 |
| 5,875,644 A | 3/1999 | Ambs et al. | 62/324.6 |
| 5,937,665 A | 8/1999 | Kiessel et al. | 62/260 |
| 5,937,934 A | 8/1999 | Hildebrand | 165/45 |
| 5,941,238 A | 8/1999 | Tracy | 126/641 |
| 5,946,928 A | 9/1999 | Wiggs | 62/260 |
| 6,138,744 A | 10/2000 | Coffee | 165/45 |
| 6,212,896 B1 | 4/2001 | Genung | 62/260 |
| 6,276,438 B1 | 8/2001 | Amerman et al. | 165/45 |

(Continued)

*Primary Examiner*—Ljiljana (Lil) V Ciric
(74) *Attorney, Agent, or Firm*—Miller, Matthias & Hull

(57) ABSTRACT

A system for installing sub-surface fluid transport tubing and pressure testing coupling seals in a vertically oriented geothermal heating/cooling system installation, and particularly in a direct exchange system installation, includes providing an elevated containment area, that has a confined space opening, supported by extensions/poles, within which opening an upper portion of the fluid transport tubing segment, to be installed within the borehole, can be positioned and contained. The system further includes pressure testing aboveground segmental coupling seals, by using moderate gas pressure applied via temporary gas hose and plug connections to respective ends of the operatively connected fluid transport line set.

9 Claims, 1 Drawing Sheet

U.S. PATENT DOCUMENTS

| | | | |
|---|---|---|---|
| 6,450,247 B1 | 9/2002 | Raff | 165/45 |
| 6,615,601 B1 | 9/2003 | Wiggs | 62/235.1 |
| 6,751,974 B1 | 6/2004 | Wiggs | 62/260 |
| 2004/0129408 A1 | 7/2004 | Wiggs | |

* cited by examiner

VERTICALLY ORIENTED DIRECT EXCHANGE/GEOTHERMAL HEATING/COOLING SYSTEM SUB-SURFACE TUBING INSTALLATION MEANS

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates to an improved sub-surface direct exchange (also commonly referred to as "direct expansion")/geothermal tubing installation means, so as to enable only one man to install vertically oriented sub-surface heat exchange fluid transport tubing, utilized in direct expansion/water-source/geothermal heating/cooling system designs, together with an optional means to pressure test all brazed/welded/fused tubing joints as they are made, prior to final tubing/line installation completion, for use in association with any geothermal heating/cooling system, or partial geothermal heating/cooling system, utilizing sub-surface vertically oriented heat exchange elements as a primary or supplemental source of heat transfer.

Geothermal ground source/water source heat exchange systems typically utilize fluid-filled closed loops of tubing buried in the ground, or submerged in a body of water, so as to either absorb heat from, or to reject heat into, the naturally occurring geothermal mass and/or water surrounding the buried or submerged tubing. Water-source heating/cooling systems typically circulate, via a water pump, a fluid comprised of water, or water with anti-freeze, in plastic (typically polyethylene) underground geothermal tubing so as to transfer heat to or from the ground in a first heat exchange step. Via a second heat exchange step, a refrigerant is utilized to transfer heat to or from the water. Finally, via a third heat exchange step, an electric fan is utilized to transfer heat to or from the refrigerant to heat or cool interior air space.

Direct exchange/direct expansion ("DX") ground source heat exchange systems, where the refrigerant fluid transport lines are placed directly in the sub-surface ground and/or water, typically circulate a refrigerant fluid, such as R-22 or the like, in sub-surface refrigerant lines, typically comprised of copper tubing, to transfer heat to or from the sub-surface elements via a first heat exchange step. DX systems only require a second heat exchange step to transfer heat to or from the interior air space by means of an electric fan. Consequently, DX systems are generally more efficient than water-source systems because of less heat exchange steps and because no water pump energy expenditure is required. Further, since copper is a better heat conductor than most plastics, and since the refrigerant fluid circulating within the copper tubing of a DX system generally has a greater temperature differential with the surrounding ground than the water circulating within the plastic tubing of a water-source system, generally, less excavation and drilling is required, and installation costs are lower, with a DX system than with a water-source system.

While most in-ground/in-water heat exchange designs are feasible, various improvements have been developed intended to enhance overall system operational efficiencies. Several such design improvements, particularly in direct expansion/direct exchange geothermal heat pump systems, are taught in U.S. Pat. No. 5,623,986 to Wiggs; in U.S. Pat. No. 5,816,314 to Wiggs, et al.; in U.S. Pat. No. 5,946,928 to Wiggs; and in U.S. Pat. No. 6,615,601 B1 to Wiggs, the disclosures of which are incorporated herein by reference. Such disclosures encompass both horizontally and vertically oriented sub-surface heat geothermal heat exchange means.

The historical installation means and function of vertically oriented sub-surface fluid transport tubing in geothermal heating/cooling systems are well understood by those skilled in the art. However, such historical installation means virtually always requires at least two men to facilitate the installation. Typically, the men install the fluid transport tubing within a pre-drilled borehole/well to the desired depth, which depth may range from 50 feet to 500 feet, or more.

Generally, in water-source system applications, long lengths (typically 50 feet, or longer) of polyethylene tubing are butt-fused together and inserted into a borehole by at least two men, who insert the tubing manually and/or via machine.

Generally, in DX system applications, 50 foot lengths of soft copper are unrolled and then one of brazed and welded together and manually inserted into a borehole by at least two men. Even in the instances where common industry standard 20 foot lengths of hard, ACR grade, copper tubing have been utilized in vertical DX system testing applications, the installations have typically required at least two men. For example, one man would insert the tubing into the borehole while a second man would steady and guide the upper portion of the 20 foot tube and/or tubes while standing at an elevated location on a ladder, on scaffolding, or the like.

Further, historically in a DX system application, the copper refrigerant transport tubing within the borehole is typically only pressure checked for leaks, via a maximum system operational pressure test usually in the 300 psi to 600 psi range, once the complete refrigerant tubing assembly has been installed, prior to filling the empty space within the borehole with a heat conductive grout, as is well understood by those skilled in the art. Thus, if a leak is detected, the entire tubing assembly is subject to withdrawal, repair, and re-insertion, which can be quite time-consuming and costly.

Vertically oriented (herein meaning at least one of vertical and vertically angled, as opposed to horizontal) installation means of geothermal fluid transport tubing requiring two men is expensive and adds to the typically high costs of geothermal systems, thereby contributing to a marketing/sales impairment. Consequently, a means to provide an efficient manner in which to install vertically oriented geothermal DX, water-source, and the like, sub-surface heat exchange fluid transport tubing, as well as a means to pressure test each joint/coupling as it is made, would be preferable. The present invention provides a solution to these preferable objectives, as hereinafter more fully described.

BRIEF SUMMARY OF THE INVENTION

It is an object of the present invention to further enhance and improve the means of installing and pressure testing vertically oriented sub-surface heat exchange fluid transport tubing of predecessor direct expansion/water-source/geothermal, heating/cooling system designs. Since a DX system is more efficient than a water-source geothermal heating/cooling system, only the preferred method of installing and optionally pressure testing a DX system's vertically oriented sub-surface tubing/refrigerant transport lines will be demonstrated and shown herein. Utilizing similar means, as taught herein, for other type geothermal systems (such as water-source systems) in the installation and optional pressure testing of their fluid transport tubing will be obvious to those skilled in the art. The present invention teaches a less cumbersome and more efficient means of fluid transport tubing insertion, and teaches a means of above-ground pressure testing of segmental coupling seals, so as to help avoid leak detection only after full assembly completion, and so as to expedite, and reduce the costs of, the entire geothermal tubing/loop installation process.

Such an improved tubing installation means is accomplished by means of providing an elevated containment means, that has a confined space central open area, within which opening an upper portion of the tubing/pipe/line, to be installed within the borehole, can be positioned and contained. The elevated containment means/area is positioned at least one of over and in the vicinity of a well/borehole. The elevated containment means/area is supported by means of extensions, such as poles, telescoping poles, boards, beams, rods, telescoping rods, tubes, angled metal, or the like, which extend from the containment means/area to the ground.

For example, a containment means may be comprised of an approximate nine to fifteen inch ring of a solid material, such as a tube, a rubber tire, a pipe, a plastic ring, or the like, which may be attached to at least three poles, which poles are about eighteen feet long, and which poles elevate the containment means/area to a height of about fifteen feet above the ground surrounding the borehole into which the fluid transport tubing is to be inserted.

The lower feet of the three poles are in a tripod formation, so as to lend stability to the upper confined space containment means/area. Also, preferably, the base of each respective pole would be secured/affixed to the ground by means of a spike, or the like, so as to prevent the base of the poles, as well as the elevated containment means, from moving once secured into the desired position relative to the borehole into which the fluid transport tubing is to be inserted.

Such an elevated containment means, supported by a pole tripod, enables only one man to position the upper portion of the fluid transport tubing, to be inserted into the borehole, through the elevated containment means/area, which provides lateral support, and to position the lower/bottom portion of the fluid transport tubing, to be inserted into the borehole, into a coupling (which supplies vertical support) positioned on the upper portion of the fluid transport tubing already mostly installed within the borehole. Once the tubing within the coupling, which coupling now connects the lower portion of the tubing to be inserted into the borehole with the upper portion segment of the fluid transport tubing already mostly installed within the borehole, is secure, the open perimeter areas of the coupling can be one of brazed, welded, fused, or the like (as is well understood by those skilled in the art), so as to make the connection leak free, all while the elevated containment means/area, instead of another man, is holding the upper portion of the fluid transport tubing, to be inserted into the borehole, in a steady position.

Multiple elevated containment means/areas may be utilized as desired, as would be obvious, for at least one of additional positioning, additional support, multiple containment means elevations, and the like. Such multiple containment means, in addition to respectively being supported by multiple tripod poles, may, alternatively, consist of one or more containment areas extending down from the primary and highest containment area. Such multiple containment areas would generally be of more value when a soft fluid transport line is being looped over, and down through, the uppermost containment area. This is because forcing soft fluid transport tubing through multiple containment areas, all positioned directly over a well/borehole, helps to straighten such tubing, such as soft copper in a DX system and polyethylene tubing in a water-source system, prior to the soft tubing's insertion into the borehole.

Preferably, an above-ground rope/cord/line/cable is attached to a bar extending across the base of the tubing assembly (the base is typically comprised of a U bend in the refrigerant transport tubing) to be lowered/inserted into the borehole, so that, upon completion of the fluid transport line connection/coupling/sealing work, the newly added fluid transport tubing segment can simply be lowered into the borehole, via a winch or the like, and stopped at a position where its upper top portion remains slightly above-ground so that it may be easily coupled to the lower/bottom segment of the next fluid transport tubing segment to be added and inserted within the borehole. The process would simply be repeated until the fluid transport tubing segments were totally installed to the desired depth. Should the fluid transport tubing assembly need to be raised prior to final grouting, one would simply utilize the winch, with a rope attached from the winch to the bar across the base of the tubing assembly, to raise the assembly to the desired elevation.

For example, utilizing this procedure on a test basis with a DX system installation, utilizing twenty foot segments of ACR grade hard copper refrigerant transport tubing (as opposed to longer lengths of soft copper tubing), one man was able to install and silver solder both a smaller diameter liquid refrigerant transport line/tube, subsequently adding surrounding insulation, and a larger diameter vapor refrigerant transport line/tube, so as to comprise a sub-surface refrigerant geothermal heat transfer line set, at a rate of about 150 to 200 feet per hour. Using a conventional and historical manner of soft copper tubing installation, it would typically take at least two men a longer period of time to install a similar vapor line and an insulated liquid line set, as the men would have to unroll and prepare the 50 foot, or 100 foot, soft copper rolls of refrigerant tubing, braze them together, and then insert them into the borehole, taking care not to unduly bend/crimp the copper lines (which is easy to do and which requires additional repair time). Additionally, testing has shown that insulating one 50 foot segment of soft copper liquid refrigerant transport line/tubing is generally far more time consuming and difficult than insulating three 20 foot segments of hard copper tubing.

Thus, testing has confirmed that the utilization of 20 foot segments of hard copper tubing, in lieu of the typical and standard utilization of 50 foot, or 100 foot, segments of soft copper tubing, can significantly speed the refrigerant tubing installation process as a whole in a vertically oriented DX sub-surface system application. Specifically, this is due to factors such as: avoiding the need to unroll and straighten the soft copper refrigerant tubing rolls; avoiding the need to insulate 50 foot to 100 foot segments of soft copper liquid refrigerant transport tubing with its associated bends and curves; and avoiding the well/borehole insertion problems frequently encountered with soft copper tubing as a result of the bends and curves rubbing against the interior walls of the well/borehole. Bends and curves in the fluid transport tubing can both increase the difficulty of tubing insertion and increase the risk of knocking soil loose from the sides of the well. When soil is knocked loose from sides of a well/borehole, two concerns are commonly encountered, namely, shortening the well depth and/or creating a barrier bridge within the well. The creation of a barrier bridge within the well/borehole either prevents full insertion of the heat exchange tubing loop and/or increases the difficulty of tubing loop insertion.

While, typically, only one fluid supply line and only one fluid return line would be utilized as respective supply and return lines in a line set, with each line operatively connected/coupled to the other at its lower distal end by means of a U bend coupling, each such respective supply and return line could alternatively be comprised of multiple lines if desired, as would be well understood by those skilled in the art.

Regarding leak detection, in a manner similar to DX system copper line/tubing joint/coupling leak checks, water-source system geothermal heat exchange fluid transport tubing loops are typically pressure-tested for segment coupling leaks only after they have been completely installed below ground, prior to grouting, as is well understood by those skilled in the art. Thus, if there is a leak, the entire assembly, whether a DX copper tubing assembly or a water-source plastic tubing assembly, is subject to being withdrawn, repaired, and re-inserted into the borehole.

Therefore, the present invention additionally teaches an optional means to pressure test each individual coupling, at least at one of an above-ground and an accessible location, once each coupling's solder/weld/fuse seal has been completed, thereby potentially saving an enormous amount of corrective/repair work prior to grouting and final sealing of the sub-surface tubing/loop installation.

Specifically, each coupling may be pressure tested, one above-ground tubing segment at a time, by means of temporarily attaching a moderate-pressure (50 psi to 150 psi) gas hose to an end of one of the tube segments being installed, and of temporarily attaching a seal/plug to the end of the other tube segment. The respective attachments can be made with cable clamps, for example, which cable clamps may be easily installed and removed for use with each respective tubing segment, all without damaging the tubing.

The moderate pressure gas hose would preferably be composed of a flexible type hose, such as a rubber hose, a plastic hose, a composite hose, or the like, that preferably would extend for a distance equal to at least twice as long as the vertical distance to the elevated tubing containment area. The gas hose would be attached to one of an air compressor, a moderate-pressure vapor tank (such as a tank of pressurized dry nitrogen), or the like, so that moderately pressurized (moderately pressurized herein is defined as 50 psi to 150 psi) gas could be applied to the line set, which line set would thereby be checked for leaks, upon completion of the addition of each new brazed/welded/fused line set segment. In a geothermal system application, a sub-surface line set is comprised of at least one fluid supply line/tube that is operatively coupled/connected/attached at its lower distal end, typically by means of a line/tube U bend, to at least one fluid return line/tube, so as to be able to circulate a fluid within the sub-surface line/tubing loop, as is well understood by those skilled in the art.

Typically, at least one of the utilization of pressure gages (to see if the desired test pressure remains constant) and soapy water (to see if any bubbles appear), or the like, would be utilized to ascertain the leak-free quality of each sealed coupling, as is well understood by those skilled in the art.

An advantage of utilizing such a long, flexible, gas hosing, to check for leaks after the completion of each line set coupling, would be to assist in the placement of each new line set segment into the elevated tubing containment means/area. For example, as the hose on one (a first) line of the line set, and the seal/plug on the other (a second) line of the line set, were disconnected near the top of the borehole after completion of pressure testing and after lowering the completed segments mostly into the well/borehole, the hose and the seal/plug would be newly connected to the top of the next line set segments to be installed. The upper portion of the two new line set segments would then be loosely secured, via a loose wire tie, a loose rope, or the like, so as to keep the two lines relatively near together, but in a loose enough fashion so as to allow one line at a time to be pulled into its respective coupling. Next, the top of the new line set could very simply be pulled up into and through the containment means/area by means of the long, flexible, gas hose. The process would simply be repeated until job completion.

Further, testing has indicated that such an above-ground segmental pressure testing procedure, during the vertically oriented line set installation, does not have to be conducted via a high-pressure test at the system's full maximum pressure design, which is typically 300 psi to 600 psi, as mentioned, in a DX system application. One major reason pressure tests have historically been conducted only upon completion of the full line set sub-surface installation is because a test at the system's full maximum pressure design typically requires the respective ends of the line sets, above suspect coupling seals for example, to be sealed in order to conduct the high-pressure test via the insertion of a schraeder valve, or the like, which valve is coupled to a high-pressure air/gas supply, as is well understood by those skilled in the art. Thereafter, the end seals in the lines/tubes themselves must be cut open, coupled to new line segments, re-sealed, and subsequently tested themselves under a high pressure, as temporary end seals on the respective lines would typically not be strong enough to contain the high-pressure gas without crimping or otherwise impairing the structure of the lines to which the temporary end seals were attached. Thus, unless high-pressure leak detection tests were periodically made, such as after one-third, one-half, or the like, of the sub-surface tubing installation (so as to minimize the amount of tubing required to be withdrawn, repaired, and re-inserted if a leak was detected), which would be very time consuming, it would be pointless to conduct them since every test conducted would require a high-pressure sealing of the lines, which line seals, as mentioned, would thereafter need to be cut open, connected, and re-sealed to continue adding additional line segments.

However, testing has shown that a moderate gas pressure, of only approximately 50 psi to 150 psi, can readily disclose most leaks in coupling seals, without damaging, impairing, or crimping the top ends of the line segments being tested. While a full maximum system high-pressure test can, and still should, be conducted upon completion of the line set installation prior to grouting, the slight amount of extra time necessary to moderately pressure test each coupling seal, one at a time while still readily accessible in an above-ground location, is an improved and preferable means of helping to ensure good seals and of materially helping to avoid having to potentially withdraw, repair, and re-insert an entire line set prior to grouting, as most leaks can be detected under such a moderate test pressure of 50 psi to 150 psi and can be easily repaired while still accessible.

Other customary direct expansion refrigerant system apparatus and materials would be utilized in a direct expansion system application, including at least one of a compressor, a receiver, a refrigerant expansion device, an accumulator, and an air-handler, for example, all of which are well-known to those skilled in the art, with various improvements having been previously taught by Wiggs, and are therefore not shown herein. Further, as the electrical components necessary to operate an air compressor and the lines/valves/gages appropriate to operate and monitor pressurized gas/air containment means are well-known to those skilled in the art, they are neither shown nor described herein.

The subject invention may be utilized in its entirety, or in part, so as to reduce geothermal sub-surface tubing/line/loop installation time and/or costs in a number of applications, as will be well understood by those skilled in the art.

BRIEF DESCRIPTION OF THE SEVERAL VIEWS OF THE DRAWINGS

There are shown in the drawings embodiments of the invention as presently preferred. It should be understood, however, that since any number of pole type supports, such as boards, tubes, extension tubes, metal/wood beams, angled metal, or the like, whether telescoping or not, could be utilized to support the elevated containment area, which elevated containment area, although shown here as circular, could be in any shape, such as rectangular, triangular, or the like, the invention is not limited to the simple exemplary arrangements and instrumentalities shown in the drawings, wherein.

DETAILED DESCRIPTION OF THE INVENTION

Figure 1:
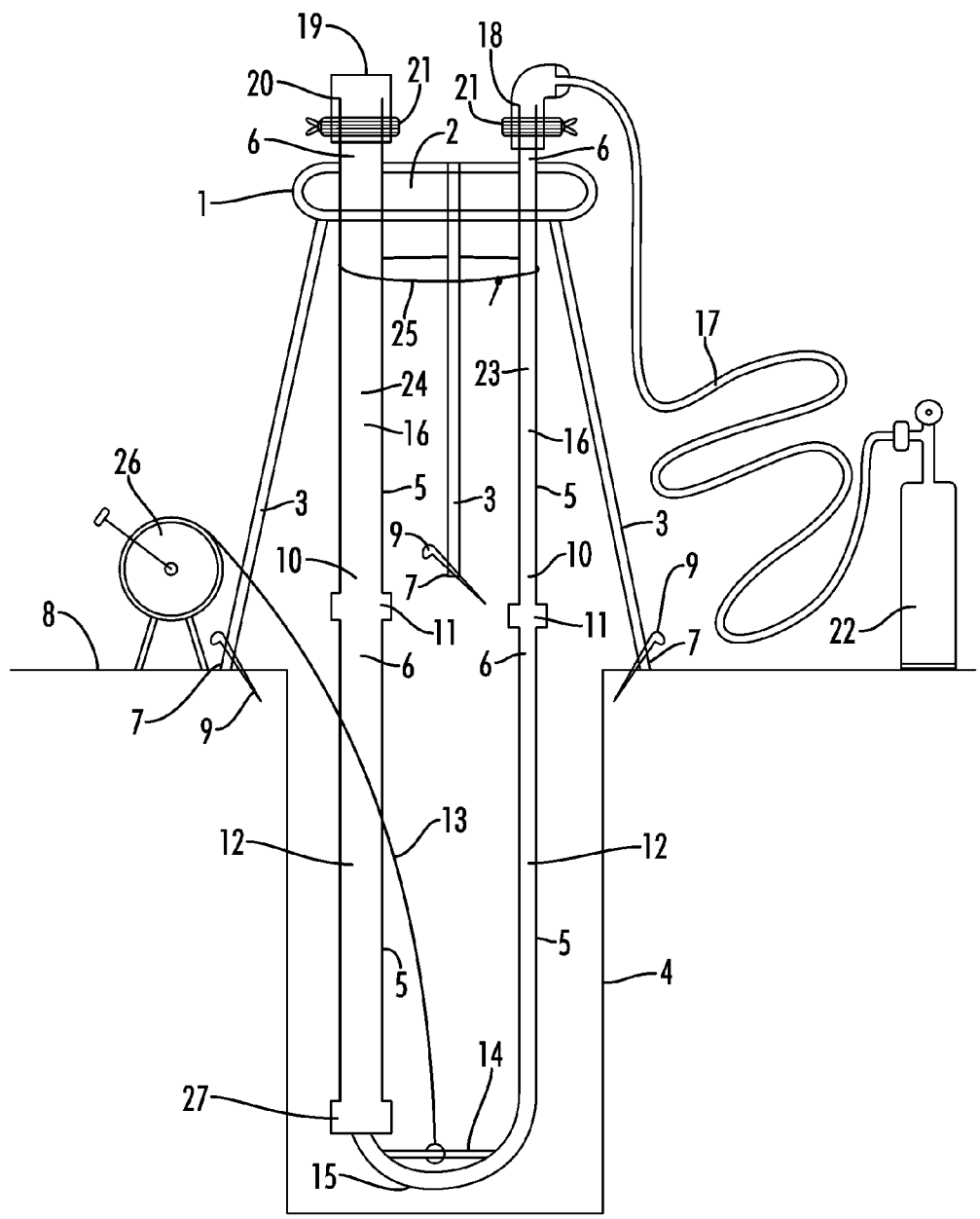
FIG. 1 is a side view of a means of installing sub-surface fluid transport tubing and pressure testing coupling seals in a vertically oriented geothermal heating/cooling system installation, and particularly in a direct exchange system installation, comprising providing an elevated containment means/area, that has a confined space opening, supported by extensions/poles, within which opening an upper portion of the fluid transport tubing, to be installed within the borehole, can be positioned and laterally contained, together with a means of pressure testing above-ground segmental coupling seals by means of a moderate gas pressure, applied by means of a temporary gas hose from a pressurized gas supply connected to one end of the fluid transport line set while a plug/seal is connected to the other respective end of the fluid transport line set.

The various features and advantages of the present invention may be more readily understood with reference to the following detailed description taken in conjunction with the accompanying drawings.

Referring now to the drawings in detail, where like numerals refer to like parts or elements, there is shown in FIG. 1 a side view of an elevated containment means 1 that has a confined space central open area 2. The elevated containment means 1 is supported by an extension means 3, shown here as poles, that extend over and beyond a well/borehole 4, into which at least two above-ground segments 16 of refrigerant fluid (not shown herein) transport tube/line/pipe 5 are to be lowered and inserted. Although not shown herein, multiple elevated containment areas may be utilized as desired, as would be obvious, for at least one of additional positioning, additional support, multiple elevations, and the like. The elevated containment area 1 is positioned at least one of over and in the vicinity of a well/borehole 4.

The upper top portion 6 of the tubing/line/pipe 5 above-ground segments 16, to be installed/inserted/lowered into the borehole 4, are laterally supported by the elevated containment means 1, which elevated containment means 1 is supported by an extension means 3, comprised of poles (shown here), telescoping poles, boards, beams, rods, telescoping rods, tubes, angled metal, or the like, which extend from the elevated containment area 1 to the ground 8.

For example, the elevated containment area 1 may consist of a nine to fifteen inch diameter ring of a solid material, such as a pipe, a rubber tire, a tube, a plastic ring, or the like, which is attached to at least three extension means/poles 3, which poles 3 are about eighteen feet long, and which poles 3 elevate the containment area 1 to a height of about fifteen feet above the ground surrounding the borehole 4, into which borehole 4 the fluid transport tubing's 5 above-ground segments 16 are to be inserted.

The lower feet 7 of the three poles 3 are preferably in a tripod formation, so as to lend stability to the elevated containment area 1. Also, preferably, the base/foot 7 of each respective pole 3 would be secured/affixed to the ground 8 by means of a spike 9, or the like, so as to prevent the base/foot 7 of the poles 3, from moving once secured into the desired position relative to the borehole 4 into which the above-ground segments 16 of the fluid transport tubing 5 are to be inserted. Thus, the elevated containment area 1 will be in a secured and stable position, typically directly above the well/borehole 4, for facilitating the insertion of each respective fluid transport tubing/line 5 above-ground segment 16. In a DX system application, such a fluid transport tubing/line 5 above-ground segment 16 would preferably be comprised of a 20 foot section of ACR grade hard copper tubing (as opposed to soft copper tubing). Testing has shown that the use of 20 foot segments of hard copper tubing, in lieu of the typical and standard utilization of 50 foot, or 100 foot, segments of soft copper tubing, speeds the refrigerant tubing installation process in a vertically oriented DX sub-surface application. Thus, hard copper tubing should preferably be utilized in lieu of soft copper tubing.

Such an elevated containment area 1, supported by a pole 3 tripod, enables only one man to position the upper top portion 6 of the fluid transport tubing 5 above-ground segments 16, to be inserted into the borehole 4, through the elevated containment area 1, and to position the lower bottom portion 10 of the fluid transport tubing 5 above-ground segments 16, to be inserted into the borehole 4, into respective couplings 11 (the couplings 11 could also be comprised of respective bell shaped ends of other fluid transport tubes, or the like) pre-positioned on the upper top portions 6 of the fluid transport tubing 5 mostly below-ground segments 12 already mostly installed within the borehole 4. Once the tubing 5 within the couplings 11, which couplings 11 now connect the lower bottom portions 10 of the tubing 5 above-ground segments 16 to be inserted into the borehole 4 with the upper top portions 6 of the fluid transport tubing 5 mostly below-ground segments 12 already mostly installed within the borehole 4, is secure, the open perimeters of the coupling 11 can be one of brazed, welded, fused, or the like (as is well understood by those skilled in the art), so as to seal the connection and make the connection leak free, all while the elevated containment area 1, instead of another man, is holding the upper portions 6 of the fluid transport tubing 5 above-ground segments 16, to be inserted into the borehole 4, in a steady position.

Preferably, a rope/line/cord/cable 13, or the like, is attached to a bar 14 extending across the base of the tubing assembly 15 (the base of the tubing assembly 15 is typically comprised of a U bend/coupling means in the fluid transport tubing 5) to be lowered/inserted into the borehole 4, so that, upon completion of the fluid transport line coupling/connection work, the newly added fluid transport tubing 5 above-ground segments 16 can simply be lowered into the borehole 4, by means of an above-ground winch 26, or the like, and stopped at a position where its upper top portion 6 remains slightly above the ground 8 (in the same manner/fashion as is shown herein with the mostly below-ground segments 12) so that the process may simply be repeated until job completion at the desired depth. The winch 26 can also be used to raise the fluid transport tubing 5 by means of the rope/line/cord/cable 13 attached to the bar 14 if and when desired.

Although the line set shown herein is a preferred DX system line set comprised of one smaller diameter liquid fluid refrigerant transport line 23 and one larger diameter refrigerant fluid transport line 24, which also respectively serve as supply and return lines in one of the heating mode and the cooling mode of system operation (as is well understood by those skilled in the art), and which are operatively connected by means of a U bend coupling 27 at the lower distal end of the fluid transport tubing and near the base of the tubing assembly 15 within the well/borehole 4, the respective fluid transport lines, 23 and 24, could each alternatively and respectively be comprised of multiple lines with multiple connections (not shown herein).

Regarding the vertically oriented sub-surface installation of long (typically fifty feet long, or greater) soft copper tubing (not shown herein) in a DX system application, and regarding the vertically oriented sub-surface installation of long (typically fifty feet long, or greater) plastic/polyethylene tubing in a water-source system application, utilization of the subject elevated containment means 1, with its confined space open area 2, supported by its extension means 3 over a well/borehole 4, will also materially assist in reducing time and manpower requirements, as the long fluid transport tubing (not shown herein) to be installed can simply be looped over and fed through (not shown herein since obvious) the elevated containment means 1, so as to be vertically oriented as it enters the well/borehole 4, thereby helping to avoid knocking soil loose from the interior sides of the borehole 4.

Further, a means is provided to moderately pressure test each coupling's 11 seal at a moderate psi pressure, in the range of 50 psi to 150 psi for example, one respective above-ground tubing segment 16 seal at a time, by means of temporarily attaching a moderate-pressure (50 psi to 150 psi) gas hose 17 to a first top end 18 of one of the above ground tube segments 16 being installed (a first above-ground tube segment), and of attaching a temporary seal/plug 19 to a second top end 20 of the other above ground tube segment 16 (a second above-ground tube segment) being installed. The respective attachments can be made, in at least one of an above-ground location and an accessible location, with cable clamps 21, for example, which cable clamps 21 will withstand the moderate pressure test and may be easily installed and removed for re-use with each new respective tubing segment (not shown herein), all without damaging the tubing 5 to which they are attached.

The moderate-pressure gas hose 17 would preferably be composed of a flexible type hose, such as a rubber hose, a plastic hose, a composite hose, or the like, that extended for a distance equal to at least twice as long as the vertical distance from the ground 8 to at least the first top end 18 of the above-ground segment 16 of the fluid transport tubing 5 within the elevated tubing containment area 1. The gas hose 17 would be attached to a compressed air/gas source 22, such as one of an air compressor, a moderate-pressure vapor tank (shown here, such as a tank of pressurized dry nitrogen), or the like, so that pressurized gas (not shown herein) could be applied (as is well understood by those skilled in the art) to the entire above-ground and sub-surface fluid transport tubing 5 line set. The line set is comprised of all the fluid transport lines 5 below ground 8 as coupled 11 to the above-ground segments 16. In a DX system, the above-ground segments 16 would preferably be comprised of two (a line set) twenty foot long, ACR grade, hard copper tubing/lines 5. In a preferable DX system design, one of the lines 5 in the line set would be comprised of a smaller diameter, insulated (insulation is not shown herein), liquid refrigerant transport line 23, and the other line 5 in the line set would be comprised of a larger diameter, un-insulated, vapor refrigerant transport line 24, as previously taught by Wiggs. In a water-source system, both water/fluid transport lines in the line set are generally the same diameter (not shown herein).

Typically, at least one of the utilization of pressure gages (to see if the desired test pressure remains constant) and soapy water (to see if any bubbles appear), or the like, would be utilized to ascertain the leak-free quality of each coupling. As the use of pressure gages and soapy water to check for pressure leaks is well understood by those skilled in the art, such testing methods/procedures are not shown herein.

The brazed/welded/fused line set couplings 11 would thereby respectively be checked for leaks upon completion of the addition of each new line set above-ground segment 16, all while the couplings 11 were readily accessible and could be easily repaired if necessary.

Another advantage of utilizing such a long, flexible, gas hose 17, to check for leaks after each line set coupling 11 has been sealed, would be to assist in the placement of each new line set above-ground segment 16 into the elevated tubing containment area 1. For example, after the gas hose 17 on an above-ground segment 16 line set's first top end 18 was disconnected, and after the temporary seal/plug 19 on the above-ground segment 16 line set's second top end 20 was disconnected, near the top of the borehole 4 after completion of pressure testing, the gas hose 17 and the temporary seal/plug 19 would be newly connected to the top of the next line set segment to be installed. The next line set segment is not shown, as it would be identical to the line set segment shown herein.

The upper portions of the above-ground line set segments 16, below the first top end 18 and the second top end 20 of the fluid transport lines 5, in a new line set segment would be loosely tied/secured together, via a loose wire tie 25 (shown herein), a loose rope, or the like, so as to keep the two lines 5 relatively near together, but in a loose enough fashion so as to allow one line 5 at a time to be pulled into its respective coupling 11. Next, so as to position the next new line set for coupling, the new line set could very simply be pulled up into and through the elevated containment area 1 by means of the long, flexible, gas hose 17 which has been temporarily attached to the first top end 18 of the above-ground segment 16 of the fluid transport line 5 by means of a cable clamp 21, or the like. The process would simply be repeated until job completion.

Thus, although there have been described particular embodiments of the present invention of a new and useful Vertically Oriented Direct Exchange/Geothermal Heating/Cooling System Sub-Surface Tubing Installation Means, it is not intended that such references be construed as limitations upon the scope of this invention except as set forth in the following claims.

What is claimed is:

1. A system for installing geothermal heat pump sub-surface, vertically oriented, fluid transport tubing in a well/borehole, the system comprising:

at least one elevated containment structure, the containment structure defining a central open area, the structure adapted to laterally support, within the central open area, fluid transport tubing when the containment structure is temporarily positioned above a well/borehole for insertion of the fluid transport tubing into the well/borehole; and an extension structure connected to and extending downward from the containment structure, the extension structure adapted to temporarily elevate and support the containment structure above a around surface proximate the well/borehole during installation of the fluid transport tubing into the well/borehole, further comprising vertically oriented fluid transport tubing for a sub-surface geothermal heat pump system, the fluid transport tubing positioned and laterally supported by the elevated containment structure for insertion into the well/borehole, wherein the lower distal end of the fluid transport tubing comprises a lower distal end of a first segment operatively coupled to an upper/top end of a second segment partially extending from and out of the well/borehole, wherein the second fluid transport tubing segment partially extending from and out of the well/borehole comprises at least one supply fluid transport tube and at least one return fluid transport tube, and said supply and return fluid transport tubes are operatively connected by a U-bend coupling positioned within the well/borehole; and, further comprising a bar attached across the coupling in the well/borehole and a rope/cord/line/cable attached to the bar and extending from the bar to above the ground surface.

2. The installation system of claim 1, wherein the fluid transport tubing is lowered and/or raised within the well/borehole by the rope/cord/line/cable which extends above the ground surface.

3. The installation system of claim 2, further comprising a winch coupled to the rope/cord/line/cable and wherein the lowering and/or raising of the fluid transport tubing is controlled by the winch.

4. The installation system of claim 1, wherein the extension structure comprises a plurality of elongated extension members.

5. The installation system of claim 4, further comprising a plurality of spikes affixing/securing the extension members to the ground surface during installation of the fluid transport tubing.

6. The installation system of claim 1, wherein the fluid transport tubing is for use in a geothermal direct exchange heat pump system.

7. The installation system of claim 6, wherein the fluid transport tubing comprises a plurality of sections/segments of hard copper tubing operatively coupled together.

8. The installation system of claim 1, wherein the fluid transport tubing is for use in a geothermal water-source heat pump system.

9. The installation system of claim 8, wherein the fluid transport tubing comprises a plurality of segments of at least one of plastic and polyethylene tubing operatively coupled together.

* * * * *